US012436626B1

(12) United States Patent
Lu et al.

(10) Patent No.: US 12,436,626 B1
(45) Date of Patent: Oct. 7, 2025

(54) MOUSE

(71) Applicant: DEXIN CORPORATION, New Taipei (TW)

(72) Inventors: Ho-Lung Lu, New Taipei (TW); Tzu-Hua Tseng, New Taipei (TW)

(73) Assignee: DEXIN CORPORATION, New Taipei (TW)

(*) Notice: Subject to any disclaimer, the term of this patent is extended or adjusted under 35 U.S.C. 154(b) by 0 days.

(21) Appl. No.: 18/830,541

(22) Filed: Sep. 10, 2024

(30) Foreign Application Priority Data

May 28, 2024 (TW) ................................. 113119600

(51) Int. Cl.
*G06F 3/0354* (2013.01)
*G06F 1/16* (2006.01)
*G06F 3/01* (2006.01)
*G06F 3/041* (2006.01)

(52) U.S. Cl.
CPC ........ *G06F 3/03543* (2013.01); *G06F 1/1656* (2013.01); *G06F 3/016* (2013.01); *G06F 3/0354* (2013.01); *G06F 3/041* (2013.01)

(58) Field of Classification Search
CPC ....... G06F 3/03543; G06F 3/041–0488; G06F 1/1656; G06F 3/016
See application file for complete search history.

(56) References Cited

U.S. PATENT DOCUMENTS

| | | | |
|---|---|---|---|
| 2009/0073123 A1* | 3/2009 | Raz | G06F 3/03543 345/166 |
| 2010/0214221 A1* | 8/2010 | Lee | G06F 3/0488 345/163 |
| 2011/0141017 A1* | 6/2011 | Ku | G06F 3/03543 345/163 |
| 2013/0169424 A1* | 7/2013 | Kujawski | G06F 3/0485 340/407.2 |
| 2019/0079584 A1* | 3/2019 | Bonanno | G06F 3/03543 |
| 2024/0143087 A1* | 5/2024 | Goh | G06F 3/016 |

* cited by examiner

*Primary Examiner* — Temesghen Ghebretinsae
*Assistant Examiner* — Ivelisse Martinez Quiles
(74) *Attorney, Agent, or Firm* — Li & Cai Intellectual Property Office

(57) ABSTRACT

A mouse is provided. The mouse includes a body, an arc-shaped protrusion, a touch module, a processing module, a vibration module, and a covering layer. The body has two buttons. The arc-shaped protrusion is disposed on the body, and the arc-shaped protrusion is arranged between the two buttons. The touch module includes a flexible circuit board. The vibration module is disposed in the body. The covering layer covers an outside of the body, and does not cover the arc-shaped protrusion. The processing module can receive a touch signal generated by the touch module that senses whether or not the arc-shaped protrusion is being touched, the processing module can control the vibration module according to the touch signal, and the processing module is configured to generate a roller signal according to the touch signal. The processing module can transmit the roller signal to an external electronic device.

11 Claims, 10 Drawing Sheets

MOUSE

CROSS-REFERENCE TO RELATED PATENT APPLICATION

This application claims the benefit of priority to Taiwan Patent Application No. 113119600, filed on May 28, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse, and more particularly to a mouse with touch-control functionality.

BACKGROUND OF THE DISCLOSURE

In a conventional optical mouse having a scroll wheel in the middle, a gap is reserved around the scroll wheel so that external dirt or liquid can easily enter the inside of the mouse by passing through the gap. This can easily cause damage to the mouse.

SUMMARY OF THE DISCLOSURE

In response to the above-referenced technical inadequacy, the present disclosure provides a mouse for improving on the issues that are associated with a conventional optical mouse having a scroll wheel in the middle. The issues are generated from external liquid passing through the gap around the scroll wheel and entering into the mouse.

In order to solve the above-mentioned problems, one of the technical aspects adopted by the present disclosure is to provide a mouse. The mouse includes a body, an arc-shaped protrusion, a touch module, a processing module, a vibration module, and a covering layer. The body has two buttons. The arc-shaped protrusion is disposed on the body, and the arc-shaped protrusion is arranged between the two buttons. The touch module includes a flexible circuit board, the flexible circuit board is arranged inside of the arc-shaped protrusion, and the flexible circuit board is located between the two buttons. The processing module is disposed in the body, and the processing module is electrically connected to the touch module. The vibration module is disposed in the body, and the vibration module is electrically connected to the processing module. The covering layer covers an outside of the body, and the covering layer does not cover the arc-shaped protrusion. The processing module is configured to receive a touch signal generated by the touch module that senses whether or not the arc-shaped protrusion is being touched, the processing module is configured to control the vibration module according to the touch signal, and the processing module is configured to generate a roller signal according to the touch signal. The processing module is configured to transmit the roller signal to an external electronic device.

In conclusion, the mouse of the present disclosure uses the cooperation of the arc-shaped protrusion and the touch module to replace the middle roller of the conventional optical mouse, thereby effectively improving on the issue in the conventional optical mouse where external liquid can easily enter the inside of the mouse by passing through the gap around the middle roller, which may cause the mouse to be damaged.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
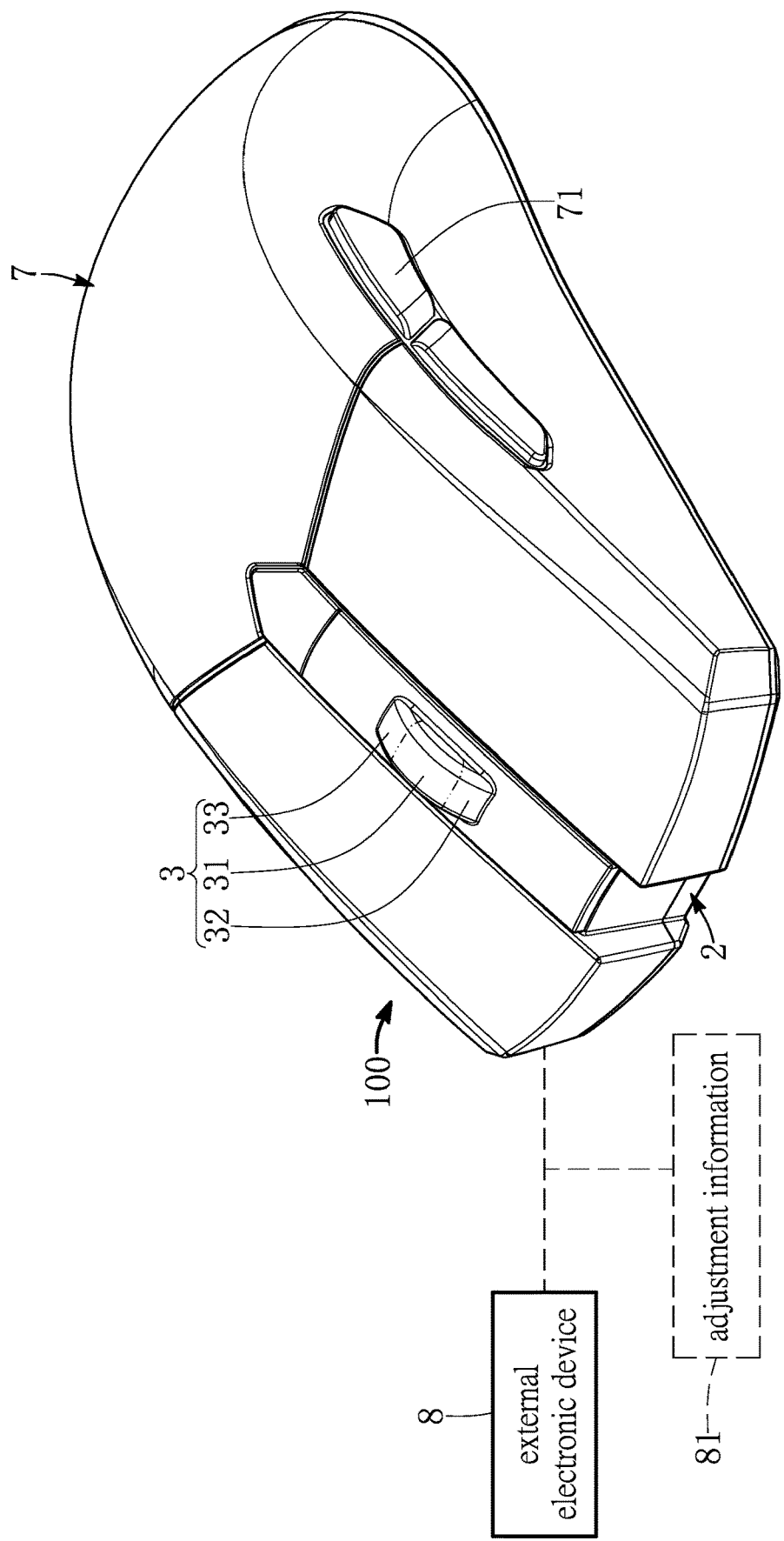
FIG. 1 and FIG. 2 are schematic views showing a mouse from different angles of view according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
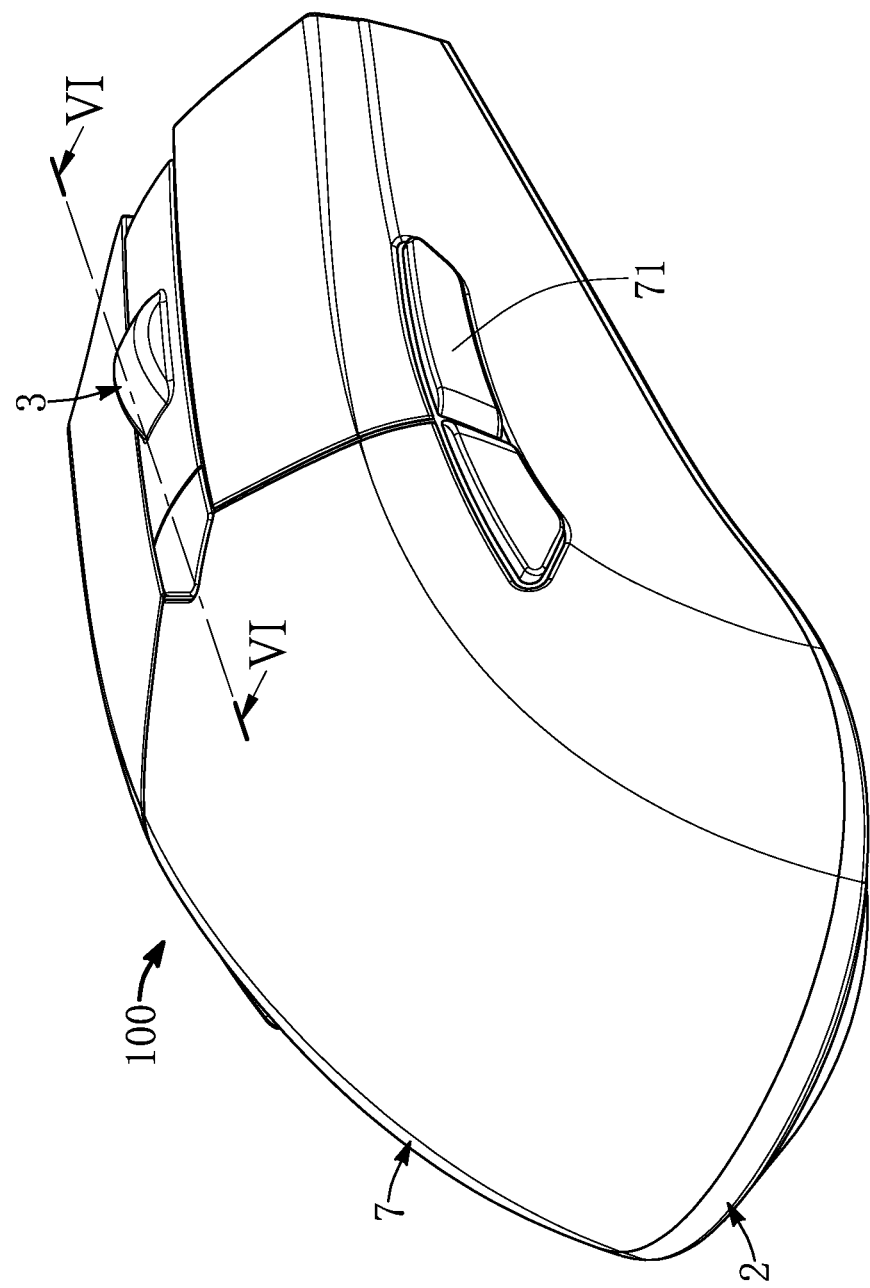
Figure 3:
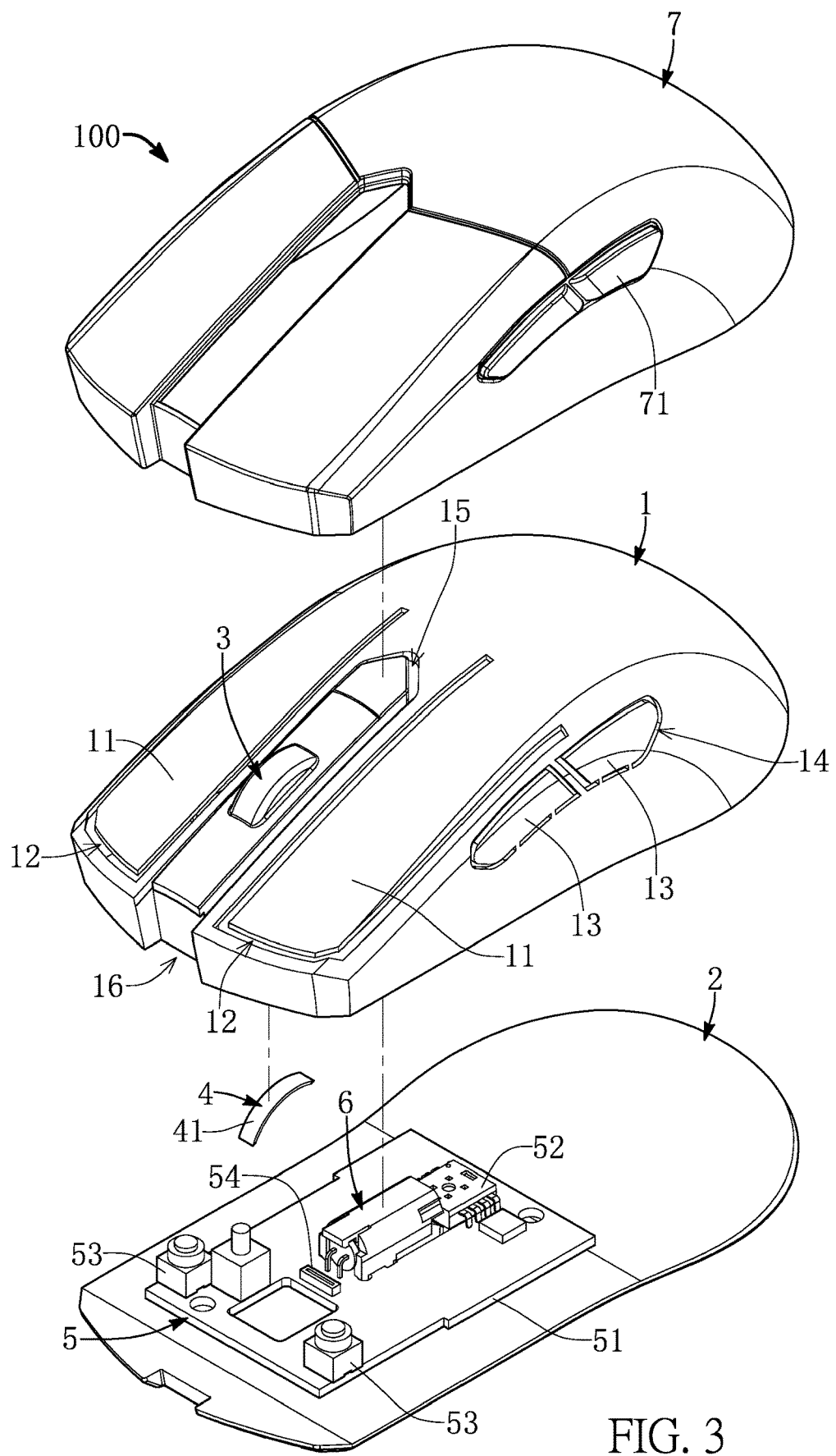
FIG. 3 and FIG. 4 are schematic exploded views showing the mouse from different angles of view according to the first embodiment of the present disclosure.
Figure 4:
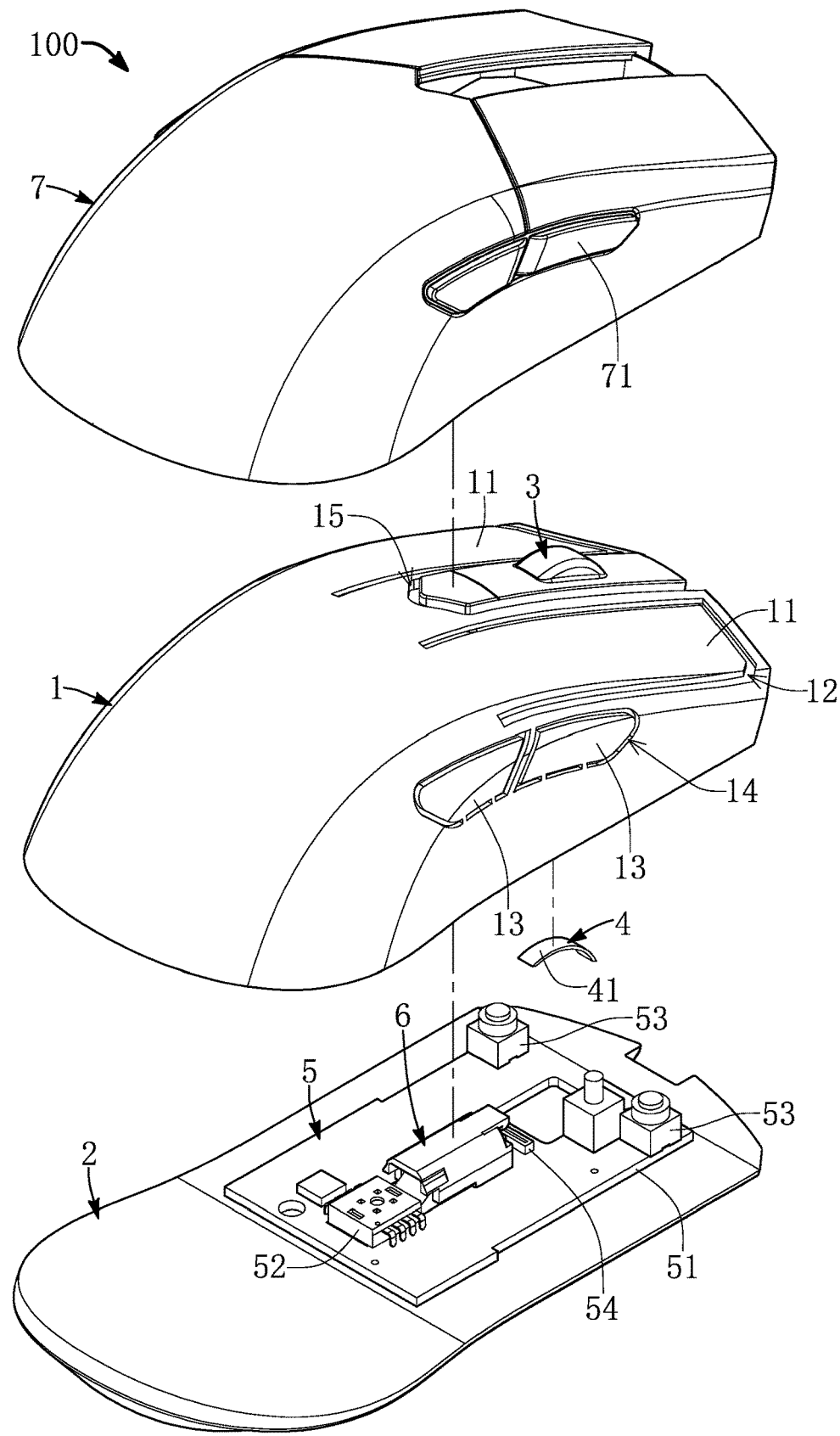
Figure 5:
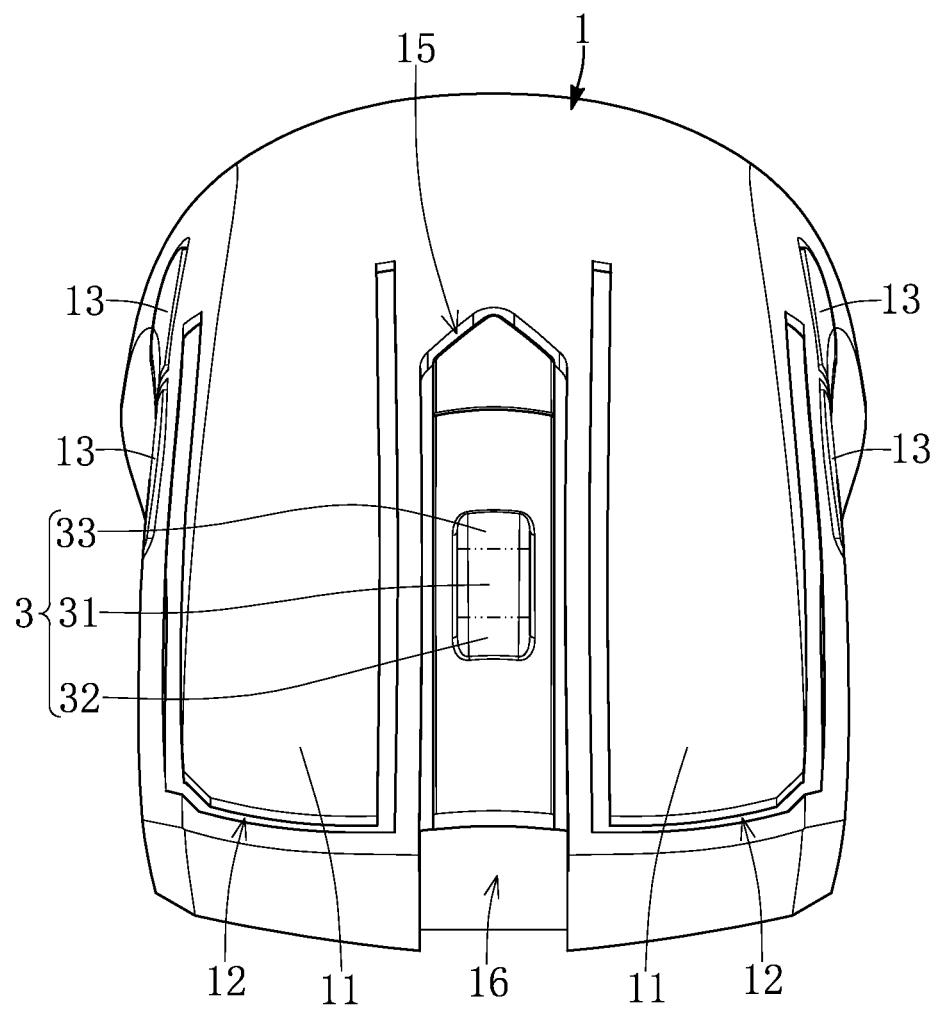
FIG. 5 is a schematic view showing a body of the mouse according to the first embodiment of the present disclosure.

As shown in FIG. 1 to FIG. 6, FIG. 1 and FIG. 2 are schematic views showing a mouse from different angles of view according to the first embodiment of the present disclosure, FIG. 3 and FIG. 4 are schematic exploded views showing the mouse from different angles of view according to the first embodiment of the present disclosure, and FIG. 5 is a schematic view showing a body of the mouse according to the first embodiment of the present disclosure.

Figure 6:
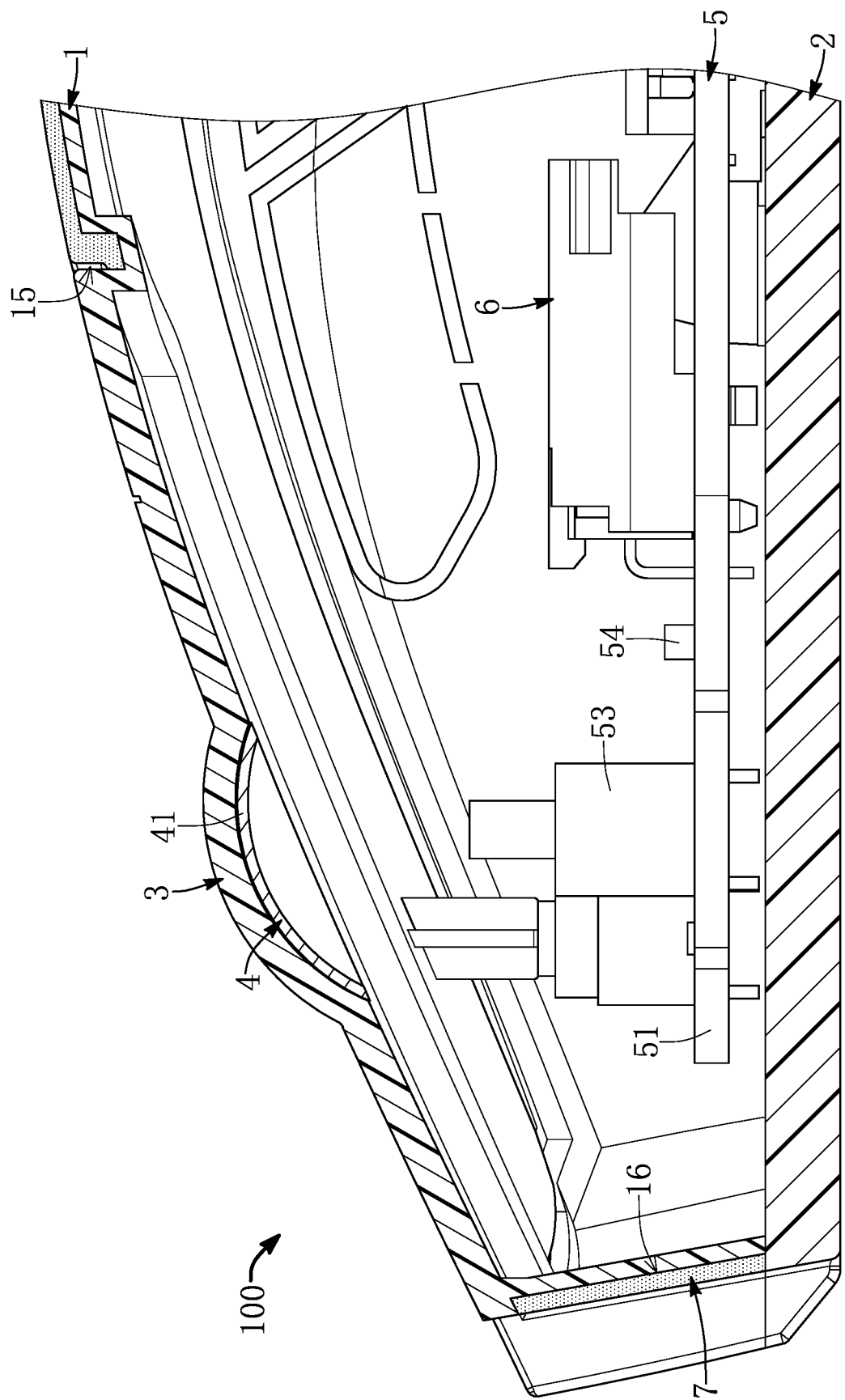
FIG. 6 is a schematic cross-sectional view taken along line VI-VI of FIG. 2 according to the first embodiment of the present disclosure.
Figure 7:
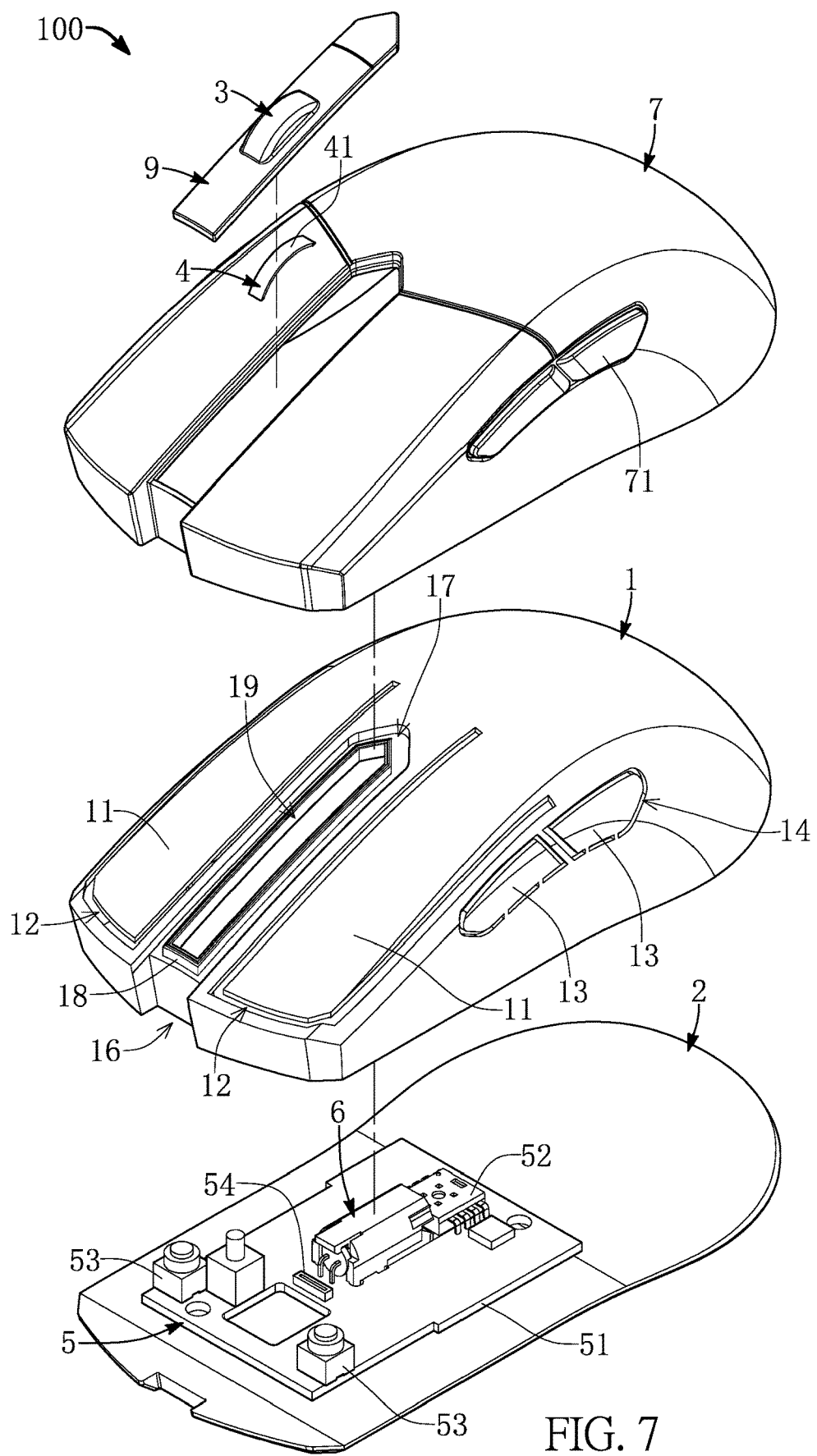
FIG. 7 is a schematic exploded view showing the mouse according to a second embodiment of the present disclosure.

FIG. 6 is a schematic cross-sectional view taken along line VI-VI of FIG. 2 according to the first embodiment of the present disclosure.

The mouse 100 of the present embodiment includes a body 1, a base 2, an arc-shaped protrusion 3, a touch module 4, a processing module 5, a vibration module 6, and a covering layer. In the following description, only the differences between the mouse 100 of the present disclosure and the conventional optical mouse will be described, and the mouse 100 of the present disclosure can include electronic components that are also provided in the conventional optical mouse. In practice, the mouse 100 of the present disclosure can include a rechargeable battery, and the rechargeable battery is arranged between the body 1 and the base 2.

The body 1 and the base 2 are detachably arranged with each other. In other words, the body 1 is assembled to the base 2 and can be disassembled from the base 2. The body 1 is a main supporting structure of the mouse 100, and is mainly used to provide the user to grip thereon. The body 1 has two buttons 11 and two U-shaped thru-holes 12. One end of each of the buttons 11 extends outwardly from the body 1, the two U-shaped thru-holes 12 are respectively arranged around the two buttons 11, and each of two the buttons 11 is an elastic sheet. The two buttons 11 are respectively a left button and a right button of the mouse 100.

In practice, two sides of the body 1 can respectively have two side buttons 13. Moreover, a quantity and a position of the side buttons 13 of the body 1 are not limited to those shown in the drawings. Each of the side buttons 13 extends from the body 1, the body 1 has a plurality of U-shaped thru-holes 12 respectively arranged around the side buttons 13, and each of the side buttons 13 is an elastic sheet.

The arc-shaped protrusion 3 is disposed on the body 1, and the arc-shaped protrusion 3 is arranged between the two buttons 11. In the present embodiment, the arc-shaped protrusion 3 and the body 1 are integrally formed as a single one-piece structure. An appearance of the arc-shaped protrusion 3 corresponds to an appearance of a middle roller of the conventional optical mouse, and the arc-shaped protrusion 3 is used to replace the middle roller of the conventional optical mouse.

The touch module 4 includes a flexible circuit board 41. The flexible circuit board 41 has a touch circuit, the flexible circuit board 41 is arranged inside of the arc-shaped protrusion 3, and the flexible circuit board 41 is correspondingly located between the two buttons 11. The flexible circuit board 41 can be connected to a flexible flat cable (not shown in the drawings), and the flexible circuit board 41 is connected to a circuit board 51 of the processing module 5 through the flexible flat cable.

The processing module 5 is arranged between the body 1 and the base 2. The processing module 5 can include the circuit board 51, a processor 52, two button switch units 53, and a flexible flat cable connector 54, etc., which are related electronic components included in a conventional mouse having a left button and a right button.

The vibration module 6 is arranged between the body 1 and the base 2. The vibration module 6 can include a vibration motor that can be fixed to the body 1 or the base 2. The vibration motor is electrically connected to the circuit board 51 to obtain power required for operation thereof. The processing module 5 is electrically connected to the vibration motor, the processing module 5 can control the vibration motor to start or stop, and the processing module 5 can also control the vibration motor to vibrate in different vibration frequencies. Moreover, a quantity, a type and a position of the vibration motor of the vibration module 6 can be changed according to practical requirements and are not limited by the present embodiment.

The processing module 5 can receive a touch signal generated by the touch module 4 that senses whether or not the arc-shaped protrusion 3 is being touched, and the processing module 5 can control the vibration module 6 according to the touch signal. The processing module 5 can generate a roller signal according to the touch signal, and can further transmit the roller signal to electronic devices (e.g., computers, smart phones, tablet computers).

In summary, the arc-shaped protrusion 3 and the touch module 4 arranged inside of the arc-shaped protrusion 3 in the mouse 100 of the present disclosure are provided to replace the middle roller of the conventional optical mouse. When the user touches on the arc-shaped protrusion 3, the touch module 4 generates the corresponding roller signal, and the processing module 5 correspondingly controls the vibration module 6. Therefore, the user feels a tactile sensation that is similar to a ratchet mode of the conventional mouse produced when sliding the middle roller of the conventional optical mouse.

In practice, the processing module 5 can control the vibration module 6 to vibrate in a first mode or a second mode according to the touch signal transmitted by the touch module 4. A vibration frequency generated from the vibration module 6 in the first mode is different from a vibration frequency generated from the vibration module 6 in the second mode.

When the processing module 5 determines that a middle region 31 of the arc-shaped protrusion 3 is continuously clicked according to the touch signal transmitted by the touch module 4, the processing module 5 controls the vibration module 6 to vibrate in the first mode.

According to the touch signal transmitted by the touch module 4, the processing module 5 can determine that the user touches the arc-shaped protrusion 3 from a frontend region 32 to a backend region 33 thereof or from the backend region 33 to the frontend region 32 thereof, so that the processing module 5 can control the vibration module 6 to vibrate in the second mode according to the touch signal generated by the touch module 4. The frontend region 32 and the backend region 33 are respectively arranged on two ends of the arc-shaped protrusion 3, and the middle region 31 is arranged between the frontend region 32 and the backend region 33.

In summary, through the design of the processing module 5 to control the vibration module 6 to vibrate in different vibration frequencies according to the user's manipulation on the arc-shaped protrusion 3 (e.g., continuous clicking, touching from the frontend region 32 to the backend region 33 of the arc-shaped protrusion 3, or touching from the backend region 33 to the frontend region 32 of the arc-shaped protrusion 3), the user can feel different types of feedback when continuously clicking and touching the arc-shaped protrusion 3. Accordingly, the user can have an experience similar to clicking and sliding the middle roller of the conventional optical mouse.

In practice, the processing module 5 can be connected to an external electronic device 8 (e.g., a computer or a smart phone), the processing module 5 can receive an adjustment information 81 transmitted from the external electronic device 8, so that the processing module 5 can correspondingly change the vibration frequency of the vibration module 6 in the first mode or the second mode according to the adjustment information 81. Specifically, the user can install an application program corresponding to the mouse 100 of the present disclosure on the computer, such that when the computer executes the application program, the user can adjust the vibration frequency in the first mode or the second mode through a setting interface of the application program.

In one of embodiments of the present disclosure, the processing module 5 can correspondingly adjust the vibration frequency of the vibration module 6 according to a speed of the arc-shaped protrusion 3 that is touched by the user from the frontend region to the backend region thereof, or a speed of the arc-shaped protrusion 3 that is touched by the user from the backend region to the frontend region thereof. Therefore, the processing module 5 can correspondingly generate a fast moving roller signal or a slow moving roller signal.

In other words, when the user quickly touches from the frontend region 32 (or the backend region 33) to the backend region 33 (or the frontend region 32) of the arc-shaped protrusion 3, the processing module 5 can control the vibration module 6 to vibrate by a relatively high frequency vibration, and the processing module 5 transmits the fast moving roller signal to the external electronic device 8 (e.g., computer), so that the user can see the webpage being browsed scroll quickly on the computer.

Relatively, when the user slowly touches from the frontend region 32 (or the backend region 33) to the backend region 33 (or the frontend region 32) of the arc-shaped protrusion 3, the processing module 5 can control the vibration module 6 to vibrate by a relatively low frequency vibration, and the processing module 5 transmits the slow moving roller signal to the external electronic device 8 (e.g., computer), so that the user can see the webpage being browsed scroll slowly (or normally) on the computer.

In summary, through the above-mentioned design, when the user is touching on the arc-shaped protrusion 3, the user can clearly know whether the touch module 4 of the mouse 100 correctly senses the user touching on the arc-shaped protrusion 3 through the vibration mode of the vibration module 6. Conversely, if the processing module 5 does not control the vibration module 6 to vibrate at different vibration frequencies according to the user's different manipulations on the arc-shaped protrusion 3, the user cannot know whether the touch module 4 of the mouse 100 correctly senses the user's touch on the arc-shaped protrusion 3. As a result, this will lead to a relatively poor user experience.

The mouse 100 can include the covering layer, and the covering layer is a soft waterproof covering layer 7. The soft waterproof covering layer 7 covers an outside of the body 1, and the soft waterproof covering layer 7 does not cover the arc-shaped protrusion 3. A hardness of the soft waterproof covering layer 7 is less than a hardness of the body 1, for example, the soft waterproof covering layer 7 is made of silicone or rubber material, and the body 1 is made of common plastic.

The soft waterproof covering layer 7 covers the body 1, each of the buttons 11, each of the side buttons 13, and each of the U-shaped thru-holes 12. The soft waterproof covering layer 7 has a plurality of soft protruding portions 71 corresponding in position to the side buttons 13, and each of the soft protruding portions 71 is pressable to trigger a corresponding one of the side buttons 13.

In practice, the body 1 has a first engaging groove 15 arranged around the arc-shaped protrusion 3, and a second engaging groove 16 recessed in a front end of the body 1. The second engaging groove 16 is in spatial communication with the first engaging groove 15. A part of the soft waterproof covering layer 7 is engaged and disposed in the first engaging groove 15 and the second engaging groove 16, and this design allows the soft waterproof covering layer 7 to be securely fixed to the body 1. The soft waterproof covering layer 7 and the body 1 can be manufactured by using dual-material injection molding technology, but the present disclosure is not limited thereto.

Through the design of the soft waterproof covering layer 7, which can cover each of the thru-holes of the body 1, the outside of the mouse 100 can be provided without any thru-hole. Accordingly, external dirt and liquid is relatively difficult to enter the inside of the mouse 100, thereby effectively increasing the service life of the mouse 100.

It is worth mentioning that, most conventional optical mice include the middle roller. In practical design, manufacturers often create a relatively larger gap around the middle roller to ensure smooth rotation for the middle roller. Due to the design of the gap, external liquid can easily pass through the gap and enter the inside of the mouse. As a result, the external liquid may damage the circuit board arranged inside the mouse.

In summary, the mouse 100 of the present disclosure uses the touch module 4 to replace the design of the middle roller of the conventional optical mouse, and cooperates with the design of the soft waterproof covering layer 7 to solve the issue that the conventional optical mouse has the gap arranged around the middle roller, which allows external liquid to easily enter into the conventional optical mouse, so that compared to the conventional optical mouse with the middle roller, the mouse 100 of the present disclosure has good waterproof effect.

Second Embodiment

Figure 8:
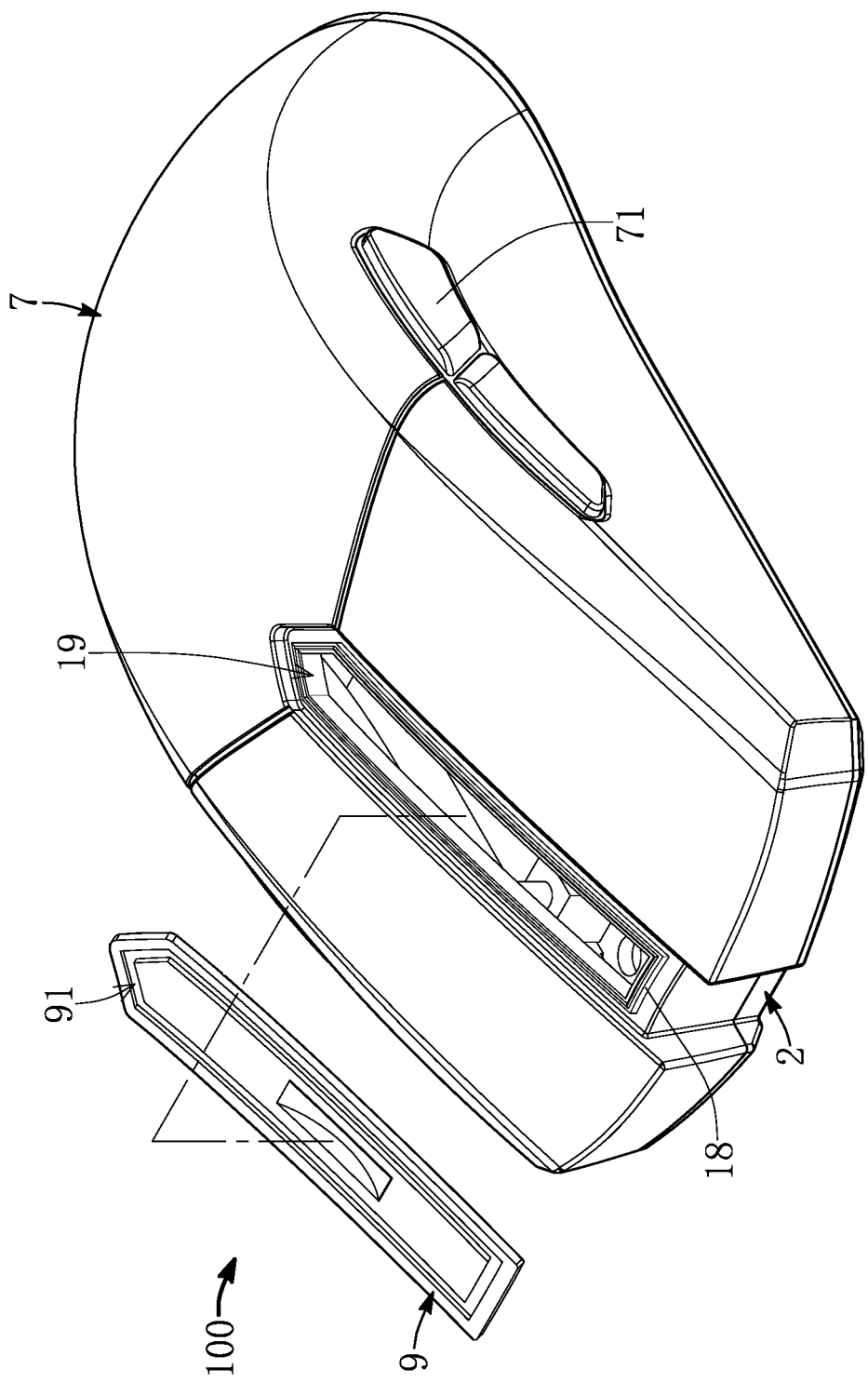
FIG. 8 is a schematic partially exploded view showing the mouse according to the second embodiment of the present disclosure.
Figure 9:
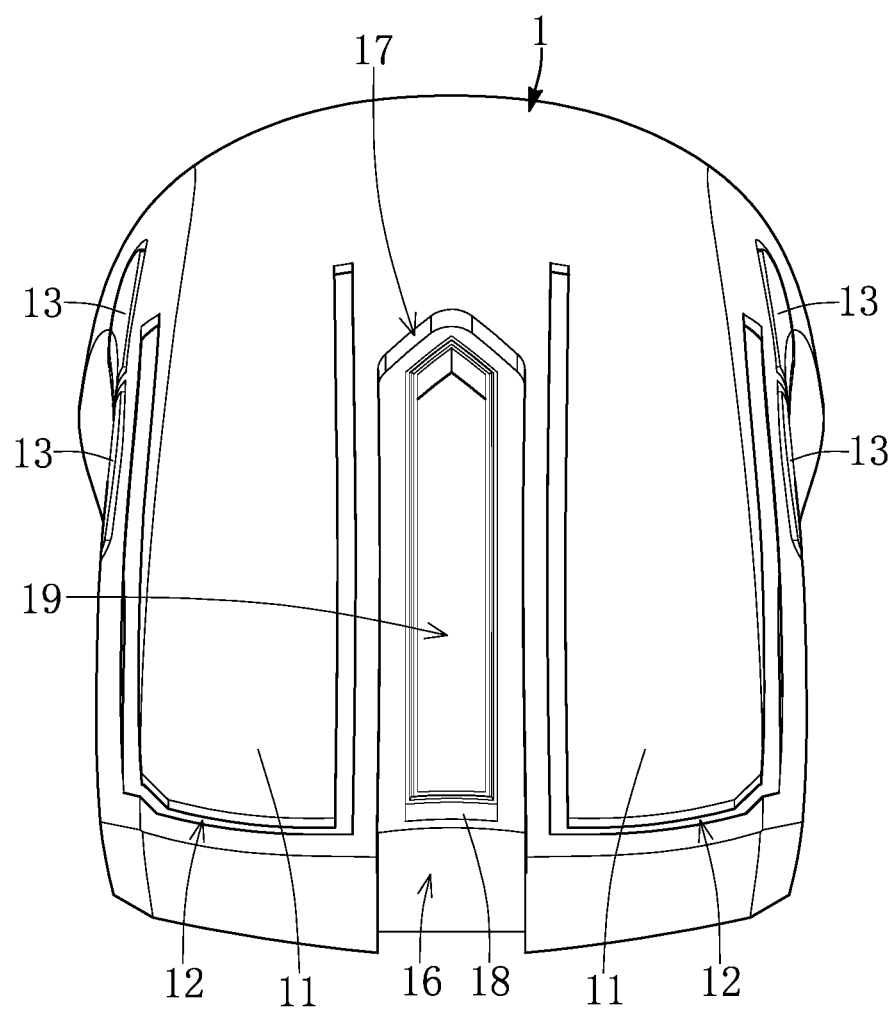
FIG. 9 is a schematic view showing the body of the mouse according to the second embodiment of the present disclosure.
Figure 10:
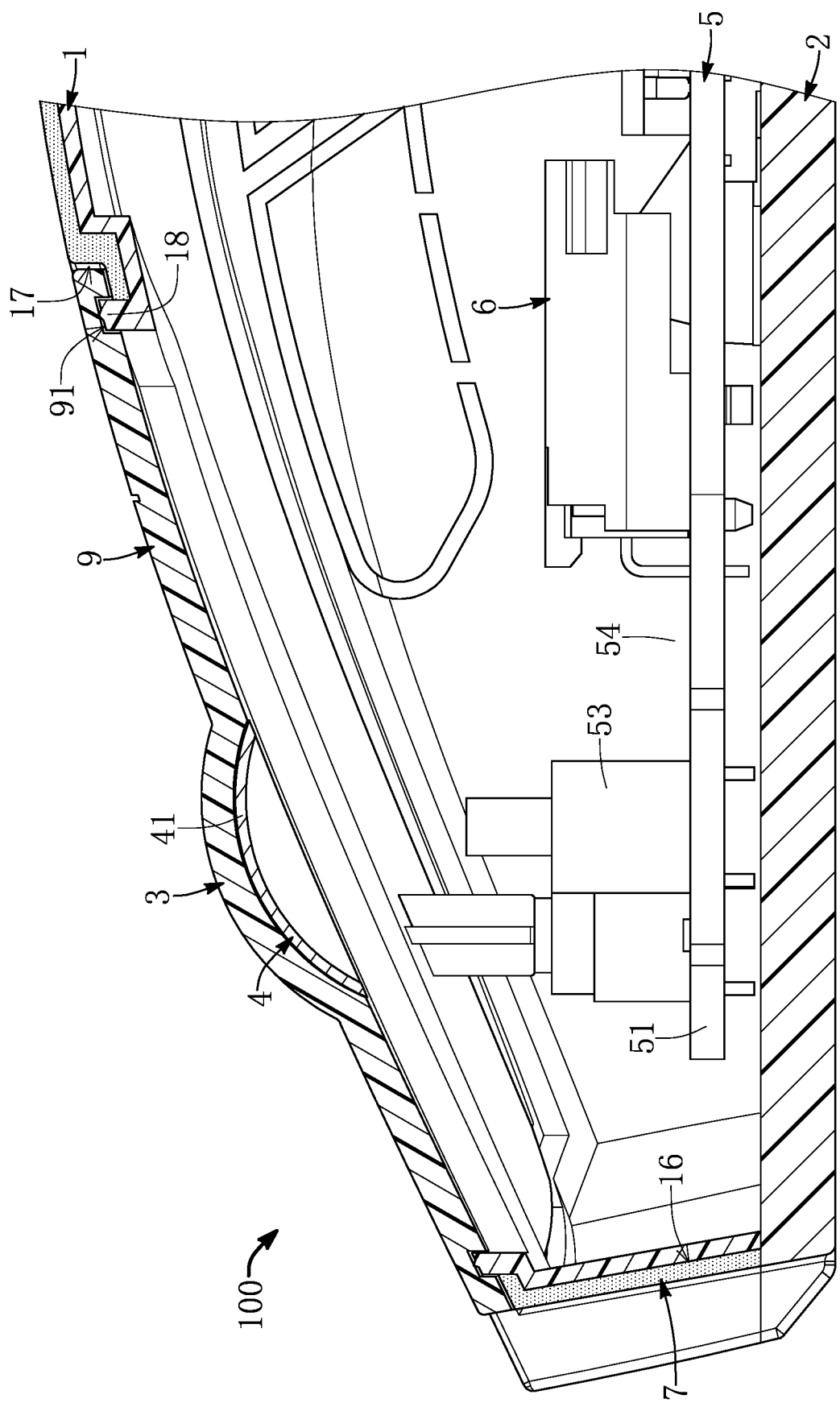
FIG. 10 is a schematic cross-sectional view showing a part of the mouse corresponding in position to that of FIG. 6 according to the second embodiment of the present disclosure.

As shown in FIG. 7 to FIG. 10, FIG. 7 is a schematic exploded view showing the mouse according to a second embodiment of the present disclosure, FIG. 8 is a schematic partially exploded view showing the mouse according to the second embodiment of the present disclosure, FIG. 9 is a schematic view showing the body of the mouse according to the second embodiment of the present disclosure, and FIG. 10 is a schematic cross-sectional view corresponding in position to that of FIG. 6 and showing the mouse according to the second embodiment of the present disclosure.

One of the differences between the present embodiment and the previous embodiment is described as follows: the body 1 has a groove 17, the groove 17 is arranged between the two buttons 11, and the body 1 has an annular protruding wall 18 arranged in the groove 17. The annular protruding wall 18 and a side wall forming the groove 17 jointly form an annular groove. In other words, the annular groove is correspondingly formed on a periphery of the annular protruding wall 18. A height of the annular protruding wall 18 is less than a depth of the annular groove, and the annular protruding wall 18 does not protrude from the annular groove. The body 1 further has a body thru-hole 19, the body thru-hole 19 penetrates through the body 1, and the body thru-hole 19 is defined by the annular protruding wall 18. The body 1 has a second engaging groove 16 recessed in a front end thereof, and the second engaging groove 16 is in spatial communication with the annular groove.

The soft waterproof covering layer 7 of the present embodiment covers the outside of the body 1, a part of the soft waterproof covering layer 7 is engaged in the annular groove, a part of the soft waterproof covering layer 7 covers the second engaging groove 16, and the soft waterproof covering layer 7 does not cover the body thru-hole 19. A thickness of the soft waterproof covering layer 7 covering the annular groove is less than a depth of the annular groove, and the soft waterproof covering layer 7 does not protrude from the groove 17. Through the design of the annular groove and the second engaging groove 16, the soft waterproof covering layer 7 can be better formed on the body 1, and the soft waterproof covering layer 7 can be more firmly connected to the body 1.

Another one of the differences between the present embodiment and the previous embodiment is described as follows: the mouse 100 further includes an auxiliary component 9, and the arc-shaped protrusion 3 is formed on the auxiliary component 9. The auxiliary component 9 is a component being independent from the body 1. In other words, the auxiliary component 9 and the body 1 are two independently manufactured components, and the auxiliary component 9 and the body 1 are not integrally formed as a single one-piece structure.

An inside of the auxiliary component 9 has an annular engagement groove 91. The annular engagement groove 91 and the annular protruding wall 18 are engaged with each other, and the auxiliary component 9 correspondingly covers the body thru-hole 19. In practice, the annular engagement groove 91 and the annular protruding wall 18 can be connected by ultrasonic welding, or by using adhesive. In a different embodiment, the auxiliary component 9 and the annular protruding wall 18 can be engaged with each other without using adhesive or ultrasonic welding for connection.

In practice, a size of the auxiliary component 9 can be substantially the same as a size of the groove 17. After the annular engagement groove 91 of the auxiliary component 9 and the annular protruding wall 18 are engaged with each other, a part of the auxiliary component 9 is arranged in the groove 17, and a part of the auxiliary component 9 is arranged above the soft waterproof covering layer 7 covering the annular groove. The auxiliary component 9 and the soft waterproof covering layer 7 covering the annular groove can be fixed to each other by ultrasonic welding.

In summary, through the design of the annular engagement groove 91, the annular groove, the annular protruding wall 18 and the soft waterproof covering layer 7 of the auxiliary component 9, when the auxiliary component 9, the body 1 and the soft waterproof covering layer 7 are connected to one another, external dirt and liquid is difficult to enter into the mouse 100 by the body thru-hole 19.

Beneficial Effects of the Embodiments

In conclusion, the mouse of the present disclosure uses the cooperation of the arc-shaped protrusion and the touch module to replace the middle roller of the conventional optical mouse, thereby effectively improving on the issue in the conventional optical mouse where external liquid can easily enter the inside of the conventional optical mouse by passing through the gap around the middle roller. Moreover, the mouse of the present disclosure retains the design of the two buttons, so that the user can retain the feel of pressing the left button and the right button of the mouse. Through the mutual cooperation between the soft waterproof covering layer and the body, the overall waterproof effect of the mouse of the present disclosure can further be improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse, comprising:
   a body having two buttons;
   an arc-shaped protrusion disposed on the body, wherein the arc-shaped protrusion is arranged between the two buttons;
   a touch module including a flexible circuit board, wherein the flexible circuit board is arranged inside of the arc-shaped protrusion, and the flexible circuit board is located between the two buttons;
   a processing module disposed in the body, wherein the processing module is electrically connected to the touch module;
   a vibration module disposed in the body, wherein the vibration module is electrically connected to the processing module; and
   a covering layer covering an outside of the body, wherein the covering layer does not cover the arc-shaped protrusion;
   wherein the processing module is configured to receive a touch signal generated by the touch module that senses whether or not the arc-shaped protrusion is being touched, the processing module is configured to control the vibration module according to the touch signal, and the processing module is configured to generate a roller signal according to the touch signal; and wherein the processing module is configured to transmit the roller signal to an external electronic device;
   wherein the processing module is configured to correspondingly adjust a vibration frequency of the vibration module according to a speed of a touch input over the arc-shaped protrusion that is touched from a frontend region to a backend region thereof or a speed of a touch input over the arc-shaped protrusion that is touched from the backend region to the frontend region thereof.

2. The mouse according to claim 1, wherein the processing module is configured to control the vibration module to vibrate in a first mode or a second mode according to the touch signal transmitted by the touch module, a vibration frequency generated from the vibration module in the first mode being different from a vibration frequency generated from the vibration module in the second mode; and wherein, when the processing module determines that a middle region of the arc-shaped protrusion is continuously clicked according to the touch signal transmitted by the touch module, the processing module controls the vibration module to vibrate in the first mode.

3. The mouse according to claim 2, wherein, according to the touch signal transmitted by the touch module, the processing module is configured to determine that the arc-shaped protrusion is touched from the frontend region to the backend region thereof or is touched from the backend region to the frontend region thereof, so that the processing module is configured to control the vibration module to vibrate in the second mode according to the touch signal generated by the touch module, and wherein the frontend region and the backend region are respectively arranged on two ends of the arc-shaped protrusion, and the middle region is arranged between the frontend region and the backend region.

4. The mouse according to claim 2, wherein the processing module is configured to receive an adjustment information transmitted by the external electronic device, so that the processing module is able to correspondingly change the vibration frequency of the vibration module in the first mode according to the adjustment information, and the processing module is able to correspondingly change the vibration frequency of the vibration module in the second mode according to the adjustment information.

5. The mouse according to claim 1, wherein the covering layer is a soft waterproof covering layer, and a hardness of the soft waterproof covering layer is less than a hardness of the body, wherein each of the two buttons extends from the body, the body is has two U-shaped thru-holes respectively arranged around the two buttons, and each of the two buttons is an elastic sheet, and wherein the soft waterproof covering layer covers the body, each of the two buttons, and each of the two U-shaped thru-holes.

6. The mouse according to claim 5, wherein the body has a first engaging groove arranged around the arc-shaped protrusion, the body has a second engaging groove recessed in a front end thereof, the second engaging groove is in spatial communication with the first engaging groove, and a part of the soft waterproof covering layer is engaged and disposed in the first engaging groove and the second engaging groove.

7. The mouse according to claim 5, wherein the body has a plurality of side buttons arranged on at least one side thereof, each of the plurality of side buttons extends from the body, the body has a plurality of U-shaped thru-holes respectively arranged around the plurality of side buttons, and each of the plurality of side buttons is an elastic sheet, wherein the soft waterproof covering layer covers the body, each of the plurality of side buttons, and each of the plurality of U-shaped thru-holes, wherein the soft waterproof covering layer has a plurality of soft protruding portions corresponding in position to the plurality of side buttons, and wherein each of the plurality of soft protruding portions is pressable to trigger a corresponding one of the plurality of side buttons.

8. The mouse according to claim 5, wherein the soft waterproof covering layer is made of silicone or rubber material.

9. The mouse according to claim 1, wherein the body has an annular groove and a body thru-hole, the body thru-hole penetrates through the body, and the annular groove is arranged around the body thru-hole, wherein the covering layer is a soft waterproof covering layer that covers an outside of the body, a part of the soft waterproof covering layer is engaged in the annular groove, and the soft waterproof covering layer does not cover the body thru-hole, and wherein the mouse further includes an auxiliary component, the arc-shaped protrusion is formed on the auxiliary component, the auxiliary component is a component being independent from the body, a part of the auxiliary component and the body are fixed to each other, the part of the auxiliary component is connected to the soft waterproof covering layer, and the auxiliary component covers the body thru-hole.

10. The mouse according to claim 9, wherein the body has a groove, the body has an annular protruding wall arranged in the groove, the annular groove is correspondingly formed on a periphery of the annular protruding wall, and the body thru-hole is defined by the annular protruding wall, wherein a thickness of the soft waterproof covering layer covering the annular groove is less than a depth of the annular groove, and wherein an inside of the auxiliary component has an annular engagement groove, the annular engagement groove and the annular protruding wall are engaged with each other, a part of the auxiliary component is located in the annular groove, and a part of the auxiliary component is connected to the soft waterproof covering layer covering the annular groove.

11. The mouse according to claim 10, wherein the soft waterproof covering layer is made of silicone or rubber material.

* * * * *